G. W. UPTON.
FISHING TACKLE.
APPLICATION FILED APR. 27, 1914.

1,140,779.

Patented May 25, 1915.

Witnesses
John C. Quinn
H. T. Upton

Inventor
George W. Upton

UNITED STATES PATENT OFFICE.

GEORGE W. UPTON, OF WARREN, OHIO.

FISHING-TACKLE.

1,140,779.                    Specification of Letters Patent.    Patented May 25, 1915.

Application filed April 27, 1914. Serial No. 834,666.

*To all whom it may concern:*

Be it known that I, GEORGE W. UPTON, a citizen of the United States of America, residing at Warren, in the county of Trumbull and State of Ohio, have invented certain new and useful Improvements in Fishing-Tackle, of which the following is a specification.

This invention relates to that class of fishing reels known as "self thumbing" or "anti-back-lash" reels, and has for its object to improve upon the construction of such reels as are disclosed in the U. S. Patents #871,167 Nov. 19, 1907, to Gilmore and No. 881,850 March 10, 1908, to Flegel.

With these and other objects in view, the invention consists in the novel details of construction and combinations of parts more fully hereinafter disclosed and particularly pointed out in the claims.

Figure 1:
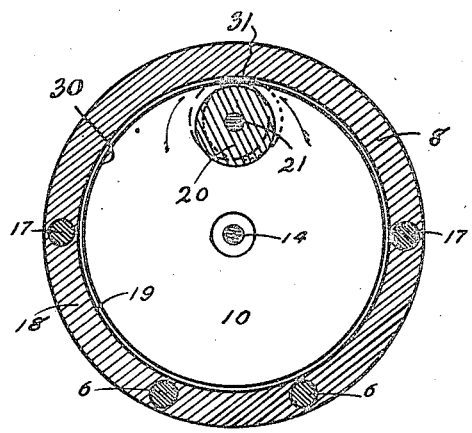
Figure 2:
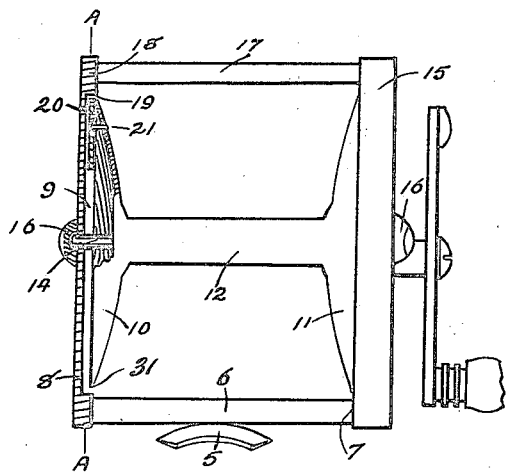

Referring to the accompanying drawing forming a part of this specification in which like numerals designate like parts in all the views:—Figure 1 is a cross sectional view on line A—A Fig. 2 of a reel made in accordance with my invention; and Fig. 2 is a side elevational view partly in section of the parts shown in Fig. 1.

In the use of reels of this nature it is well known that the spool will at times unless it is retarded, revolve at a speed greater than that of the line being paid out, so that centrifugally acting governors of the character disclosed in the patents above mentioned are employed to prevent the said spool from over running the line. But it is also well known that these said governors are either made to function for a rotation of the spool in a given direction, or else that they have to be taken off, or reset, if it is desired that they act when the spool is revolving in an opposite direction. It results from this that a reel designed for a right handed person is not adapted without a change of some sort for use by a left handed person. My invention on the other hand obviates this objection in that it provides a centrifugally operated governor for reel spools that will retard their rotations equally well when the reels are used by left as by right handed persons, or will be equally as effective whether the spool revolves in one direction or in another.

My invention also serves to automatically stop the rotation of the spool when the bait has stopped and the out going line ceases its forward pull; it further eliminates all members heretofore required to retain the governors in a prescribed or operable relation to the side plate of the reel against which they rub; and it also reduces the number of mechanical elements heretofore found necessary, thereby proportionately reducing the percentage of the liabilities of breakings or failures to operate. It follows that my invention serves to reduce the number of mechanical operations necessary for its construction and consequently the cost of manufacture.

Referring to the drawings, 5 indicates any suitable means for securing the reel to the fishing rod, 6 represents the cross connections or pillars, the ends of which are secured to the side plates 7 and 8. One of said side plates, as 8, is hollowed out as at 9 to form the overhanging flange 18 provided with the annular braking surface 19. The said surface 19 is slightly larger in diameter than is the outer circumference of the flange 10 of the spool 12, and said spool is provided with pivots 14 journaled in suitable bearings 16, so that the said circumference of the flange 10 is adapted to revolve just inside of the inner edge of the braking surface 19, as best shown in Fig. 2.

17 represents additional pillars somewhat similar to the pillars 6. Near the periphery of the flange 10 is the brake member or governor 20 mounted on the pivot 21. One or more of such governors may be used according to the size of the reel, and in the form illustrated they are conveniently made by stamping out or otherwise forming them from sheet rubber, metal or other suitable material. Said governors can further be made of any suitable contour, but I prefer to make them of the circular contour shown, and it is convenient to make them in the form of a disk.

The center of the pivot 21 passes through the governor 20 at a point outside of its center of gravity, and the dimensions and location of the parts are so chosen that when the reel is stationary, and the governor 21 is in its uppermost position, as shown in Fig. 1, the upper surface 31 of said governor will lie just inside of the periphery 30 of the said flange 10. Further the said governor 20 is very loosely mounted on the said pivot 20, so that centrifugal force is free to act thereon.

It will be clear from the foregoing that the flange 10 may be turned in a counter clockwise direction or in a clockwise direction as seen in Figs. 1 and 2 according to whether the operator is a right handed person or a left handed person and that in each case the governor 20 will function properly. Therefore it follows that it is not necessary to take the reel apart or to make any adjustments whatever to adapt this reel to a right handed or to a left handed person. In addition to the above, it is well recognized among fishermen that it is very desirable indeed to effectually stop the rotation of the reel after the bait has ceased to move, and the circular shape of the disk 20 greatly aids in this desirable result in that since its braking surface is circular, it can wedge itself up against the overhanging flange 19 much more effectually than is the case when the said governor member 20 is made elongated or of other shape. In other words since the said disk is loosely mounted on the pivot 21 it is always free to turn thereon until its circular surface wedges up against the overhanging flange 19 and so jambs the parts as to prevent them from turning. While this jambing action of course is slight and in no sense is objectionable to the operation of the reel, yet at the same time it is very effectual in stopping the reel and should be carefully distinguished from the dragging action which is present in governors of other shapes.

It is obvious that those skilled in the art may vary the details of construction, as well as the arrangement of parts without departing from the spirit of my invention and therefore I do not wish to be limited to the above disclosure except as may be required by the claims.

What I claim is:

1. In a fishing reel the combination of a spool provided with a flange; a circular governor member eccentrically pivoted near the circumference of said flange; and an overhanging circular lip against which said circular governor member is adapted to be thrown by centrifugal force when said spool is rotated in either direction and thereupon exert a braking action on said spool, substantially as described.

2. In a fishing reel the combination of a spool provided with a flange; a circular governor member eccentrically pivoted near the circumference of said flange; an end plate having a recess providing an overhanging circular lip against which said circular governor member is adapted to be thrown by centrifugal force when said spool is rotated in either direction and thereupon exert a braking action on said spool and means for securing said reel to a fishing rod, substantially as described.

In testimony whereof I affix my signature in presence of two witnesses.

GEORGE W. UPTON.

Witnesses:
M. G. SULLIVAN,
GEO. T. HECKLINGER.